(12) United States Patent
Ropert et al.

(10) Patent No.: US 7,063,113 B2
(45) Date of Patent: Jun. 20, 2006

(54) CLOSURE SYSTEM FOR FUEL TANK FILLER NECK AND METHOD FOR OPENING SAID FILLER NECK

(75) Inventors: Jerome Ropert, Laval (FR); Guillaume Blanc-Brude, Yokohama (JP); Dominique Girard, Montigne le Brillant (FR); Thierry Rouxel, Argentre (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 161 days.

(21) Appl. No.: 10/484,718

(22) PCT Filed: Jul. 24, 2002

(86) PCT No.: PCT/EP02/08323

§ 371 (c)(1),
(2), (4) Date: Jan. 26, 2004

(87) PCT Pub. No.: WO03/010022

PCT Pub. Date: Feb. 6, 2003

(65) Prior Publication Data

US 2005/0257852 A1    Nov. 24, 2005

(30) Foreign Application Priority Data

Jul. 25, 2001    (FR)    .................... 01 10044

(51) Int. Cl.
*B65B 1/04*    (2006.01)

(52) U.S. Cl. ............... 141/350; 141/371; 220/86.2
(58) Field of Classification Search ............ 141/1, 141/2, 346–351, 369–372; 220/86.2
See application file for complete search history.

(56) References Cited

U.S. PATENT DOCUMENTS

| | | | |
|---|---|---|---|
| 2,145,758 A * | 1/1939 | Fellows et al. | 220/822 |
| 5,145,081 A * | 9/1992 | Gravino | 220/86.2 |
| 5,435,358 A | 7/1995 | Kempka et al. | |
| 5,732,842 A * | 3/1998 | Krause et al. | 220/254.1 |

FOREIGN PATENT DOCUMENTS

| | | |
|---|---|---|
| DE | 19746236 | 5/1998 |
| EP | 0980780 | 2/2000 |
| FR | 2710721 | 4/1995 |

* cited by examiner

*Primary Examiner*—Timothy L. Maust
(74) *Attorney, Agent, or Firm*—Oblon, Spivak, McClelland, Maier & Neustadt, P.C.

(57) ABSTRACT

A closure head for a fuel tank filler pipe allowing automatic opening of a shutter under action of thrust of a nozzle on a device integrated into the top of the filler pipe and closing of the shutter when the nozzle is withdrawn. The locking of the shutter is achieved by a mechanism connected to a bodywork flap such that locking and squashing of a seal are achieved upon the closing of the bodywork flap and the opening of the bodywork flap cannot unlock the shutter without the nozzle additionally being introduced into the system. A method for opening a filler head employs the device.

20 Claims, 9 Drawing Sheets

CLOSURE SYSTEM FOR FUEL TANK FILLER NECK AND METHOD FOR OPENING SAID FILLER NECK

The present invention relates to a closure system for a fuel tank filler pipe.

Filler pipes present on fuel tanks, in particular tanks on board motor vehicles, are closed off during normal use of the tank outside filling periods. The closure is generally produced by means of a cap that is introduced into the upper part of the pipe while imparting a rotational movement to it so as to close the pipe in a liquid-tight and gas-tight manner. Various types of cap are encountered, made of metal and/or plastic, sealing being produced by clamping a seal by screwing or by turning a key introduced into the centre of the part outside the filler pipe.

The operations of removing the cap before filling the tank and of replacing this cap and closing the filler pipe after filling are most of the time carried out manually by the user or the filling station attendant. After filling the tank, it is sometimes the case that the cap is forgotten to be replaced, thus resulting in the loss of this cap and in the pipe being kept open to the atmosphere for a relatively long time. During this period, liquid fuel losses may arise and vapour escapes into the surrounding atmosphere.

With the aim of avoiding cap losses and the ensuing atmospheric contamination, closure systems integrated with the filler pipe have been proposed, replacing the traditional cap. For example, a system for a filling robot described in U.S. Pat. No. 5,435,358 is known, in which system the end section of the nozzle brings about the opening of the filler pipe by supplying a torque and driving a ring which operates a geared device.

In this system, it is difficult, however, to perfectly align the end section of the nozzle with the axis of the ring and it is not easy to envisage the rotation of the end section of the nozzle in the event of a manual use not employing a robot, for example with a traditional nozzle found in current filling stations. With this system, by contrast, the tank can be filled only in a fully robot-operated fuel-dispensing installation.

Consequently, the subject of the invention is a closure system that enables the fuel cap to be dispensed with and said pipe to be automatically closed after filling and does not necessarily require a robot-operated fuel-dispensing installation while at the same time, by contrast, allowing the manual use of traditional nozzles found in existing filling stations.

To this end, the invention relates to a closure system integrated with a fuel tank filler pipe head, comprising a shutter and enabling the automatic opening of the pipe via the action of a nozzle, according to which the shutter is retractable under the action of a thrust directed against it along an axis parallel to the axis of the filler head, and a return spring enables the shutter to be kept in the closed position.

"Fuel tank" is intended to mean any type of tank capable of storing a liquid and/or gaseous fuel under varied pressure and temperature conditions. More particularly targeted are the tanks of the type found in motor vehicles. The term "motor vehicle" is intended to equally well include cars, motor cycles and lorries.

The filler pipe is a canal which communicates with the interior of the tank and which allows the introduction of fuel.

The tank and the pipe may be made of metal or plastic.

The closure system according to the invention is well suited to a tank and filler pipe assembly of which at least one of the two components of the assembly is made of plastic. It is particularly well suited to an assembly of which the filler pipe is made of plastic. The closure system according to the invention itself comprises at least one piece made of plastic.

"Plastic" is intended to mean any material comprising at least one synthetic resin polymer.

All types of plastic may be suitable. Particularly suitable plastics belong the category of thermoplastics.

"Thermoplastic" means any thermoplastic polymer, including thermoplastic elastomers, and also their blends. The term "polymer" equally well denotes homopolymers and copolymers (binary or ternary copolymers in particular). Examples of such copolymers are, with no restriction being implied: random copolymers, block copolymers and graft copolymers.

Any type of thermoplastic polymer or copolymer whose melting point is below the decomposition temperature is suitable. The synthetic thermoplastics that have a melting range spread over at least 10 degrees Celsius are particularly suitable. Examples of such materials are those which have a polydispersity of their molecular mass.

In particular, use may be made of polyolefins, polyvinyl halides, thermoplastic polyesters, polyketones, polyamides and their copolymers. A blend of polymers or copolymers may also be used, as may a mixture of polymeric materials with inorganic, organic and/or natural fillers such as, for example, but with no restriction being implied: carbon, salts and other inorganic derivatives, and natural or polymeric fibres. It is also possible to use multi-layer structures consisting of stacked, integral layers comprising at least one of the polymers or copolymers described above.

The aim of the closure system according to the invention is to perform the function of a cap that closes in a sealed manner the upper part of the filler pipe outside tank-filling periods with the aim of avoiding any escape and loss of liquid fuel and vapour to the atmosphere when the tank contains fuel.

According to the invention, the closure system is integrated with the filler head, that is to say that it is incorporated with a set of components that are mounted on the upper end of the filler pipe and that form a head of which one part formed by a body covers the filler pipe and another part is inserted into the top of this filler pipe over a predetermined length.

The closure system allows the automatic opening of the pipe via the action of a nozzle. "Automatic opening" means opening produced by the action of the nozzle alone, to the exclusion of any other mechanical influence. The nozzle is that which equips the flexible hoses of fuel pumps in filling stations.

The closure system according to the invention comprises a shutter, that is to say a device closing the passage of the gases and liquids in the filler pipe. This shutter may be found in various forms in the closure system according to the invention. A form which is particularly suitable is a mobile plate form that plugs the passage when it is in the closed position.

According to the invention, the shutter is retractable under the action of a thrust directed against it along an axis parallel to the axis of the filler head. Various means may be present to make the shutter retractable. A means having produced good results is a rod integral with the filler head and situated at the periphery of the shutter, which may serve as an axis of rotation allowing the shutter to tilt.

The shutter is kept in the closed position by a return spring. A particularly suitable spring is a torsion spring arranged around the rod and of which one end is integral with the shutter.

According to a particular embodiment of the invention, the shutter is fitted with blocking means that can be released by a thrust force parallel to the axis of the filler head.

"Blocking means" denotes means that prevent the retraction of the shutter.

In this embodiment, all suitable blocking means may be used. Possible blocking means that give good results consist of a spider capable of locking the rotation of a ring that can be engaged, with clamping, with the shutter.

Such blocking means consist, for example, of a truncated-cylinder bezel in the form of a ring that can turn about its axis and is flattened on both its lower and upper faces, this bezel being able to be engaged, with clamping, with the shutter. This bezel is produced in a material having good dimensional stability and good chemical resistance in the presence of fuel. Plastics or metals are particularly suitable. Stainless steel has given good results.

The locking of the bezel by the spider may be produced by any suitable device. An example of such a device is a spider, in the form of a perforated cone frustum or circle, that carries on its circumference a lug that can be inserted into a notch situated on the bezel. In this example, the spider can be deformed by a force applied perpendicular to its surface, in such a way that the lug is disengaged from the notch in the bezel.

Another example that has given excellent results is that where the spider imparts the thrust to a compression spring in the form of a hairpin that is terminated by a lug that can be inserted into a notch situated on the bezel and on a body supporting this bezel. In this other example, the deformation of the spider is capable of compressing the hairpin spring and of disengaging the lug from the notch in the bezel.

When the blocking means consist of a spider as described above, the clamping engagement of the bezel with the shutter can be produced by means of a bayonet device whose interacting parts are arranged, respectively, on the inner cylindrical surface of the bezel and on the periphery of the shutter.

In this configuration of the blocking means for the shutter of the system according to the invention, the parts of the bayonet device may consist of flattened lugs whose thickness varies in the form of a bevel and which are arranged inverted one on top of the other.

A second torsion spring enables the bezel to be kept in the unlocked and unclamped position when the shutter is open. This spring has one of its ends fastened to the body covering the upper end of the filler pipe. The other end of the second spring is integral with the bezel. A securing means is provided, for example, by the introduction of a bent-over end of one turn of the spring into an orifice pierced in a tongue that extends the bezel, the end of the spring being able to pivot freely in the orifice.

In this configuration of the system according to the invention, when the tank is mounted on a motor vehicle, a rod can also connect the bezel to a bodywork flap protecting the filler head and enable the second torsion spring to be tensionsed and the bezel to be rotated as far as a locked position when the flap is closed.

The locking of the bezel in rotation may be produced in the manner described above, for example by means of the decompression of a hairpin spring terminated by a lug that is inserted into a notch situated on the bezel.

A method of fastening the rod to the bezel is that in which the rod constitutes the slider of a slot in an oblong piece in the form of a slideway borne by a tongue integral with the bezel. Advantageously, the slideway is dimensioned in such a way that the opening of the flap from a closed position has no effect on the locked-in-rotation state of the bezel.

The invention also relates to a method for opening a fuel tank filler head by the introduction of a nozzle, according to which, after opening a bodywork flap protecting the filler head, the forceful introduction of the nozzle in a direction parallel to the axis of the filler head against a spider causes first of all the unlocking of a bezel in the form of a rotationally mobile flattened ring, then the unblocking and unclamping of a shutter followed by its tilting and its opening by retraction, the introduction thrust force being sufficient to overcome a return force exerted by a spring, and the unlocking of the rotation of the bezel and the opening of the shutter being carried out in the following way:

a) a thrust force is exerted on the spider in a direction parallel to the axis of the filler head, which causes first of all the unblocking of the rotation of the bezel and then the gradual opening of a bayonet tending to unblock and unclamp the shutter;

b) a second spring, tensioned in torsion and one end of which is fixed and the other end of which is integral with the bezel, relaxes and so drives the bezel in rotation in a direction favourable to the opening of the bayonet;

c) under the effect of this rotation, bevel-cut lugs arranged on the internal cylindrical face of the bezel disengage from analogous inverted bevels situated around the shutter, so as to disunite the bezel and the shutter previously assembled with force by clamping;

d) a compressible circular seal arranged at the periphery of the shutter, between the latter and the bezel, decompresses and the shutter tilts.

In this method, the meaning of the terms employed is identical to that of the same terms used in the preceding description of the closure system.

According to this method, after opening, the filler head is closed off again and locked via the closing of the bodywork flap, by a lateral movement of a rod, one end of which is articulated at a point situated at the base of the flap and the other end of which serves as a slider of a slot in an oblong piece in the form of a slideway borne by a tongue that extends the bezel, the movement of the rod causing the bezel to turn in a direction favourable to closing the bayonet, to clamping the seal and to the blocking of the bezel in rotation by the spider.

As stated above for the closure system according to the invention, the locking of the bezel in rotation may be produced, for example, by decompressing a hairpin spring terminated by a lug that is inserted into a notch that has been cut into the bezel.

The figures that follow aim to illustrate the invention in the specific case of the closure of a fuel tank filler pipe belonging to a motor vehicle, without limiting its scope.

FIGS. 4 and 5 show the closure system in its closed state, flap closed, bezel locked and shutter closed. FIG. 4 gives a perspective view and FIG. 5 a plan view of the system.

FIGS. 6 to 9 illustrate the case of a closed system, flap open, bezel locked and shutter closed. FIG. 6 is a perspective view, FIG. 7 is a view in section along axis EE marked on the plan view of FIG. 8.

FIGS. 14 to 17 illustrate the case of a closed system, flap open, bezel unlocked and shutter closed. FIG. 14 is a perspective view.

FIGS. 18 and 19 illustrate the case of an open system, flap open, bezel unlocked and shutter open. FIG. 18 is a plan view and FIG. 19 a view in section along axis CC of FIG. 18. In these figures, it is possible to discern the shutter in the open tilted position, allowing the passage of the dispensing nozzle.

Figure 1:
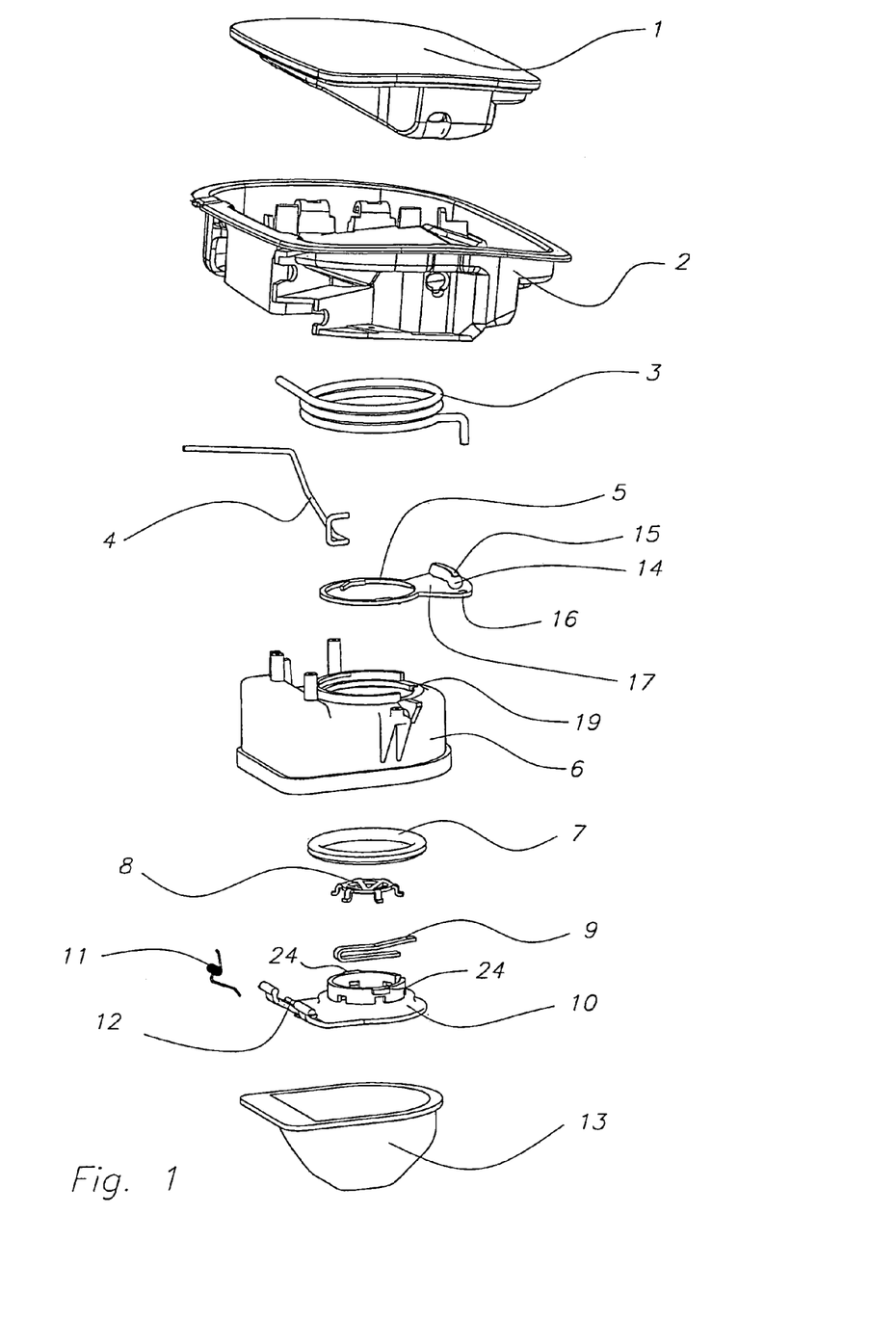
FIG. 1 gives an exploded perspective view of the various components constituting a closure system according to the invention.

Illustrated in FIG. 1, from top to bottom, are various components making up the closure system: a bodywork flap (1), a flap housing (2), a torsion spring (2), a rod (4), a bezel (5), comprising a tongue (17) that bears an orifice (16) and an oblong piece (14) with a slideway (15), a body (6) supporting the bezel (5), a compressible seal (7), a spider (8) a compression spring (9) in the form of a hairpin, a shutter (10) fitted with another torsion spring (11) and with a rotation spindle (12), and a guide (13) for a nozzle. The spring (3) acts as a return spring, rotationally returning the bezel (5) towards its unlocked position. The spring (11) acts as a return spring, returning the shutter (10) towards its closed position. The flattened lugs (23) and (24) situated on the periphery of the shutter (10) can also be distinguished in FIG. 1.

Figure 2:
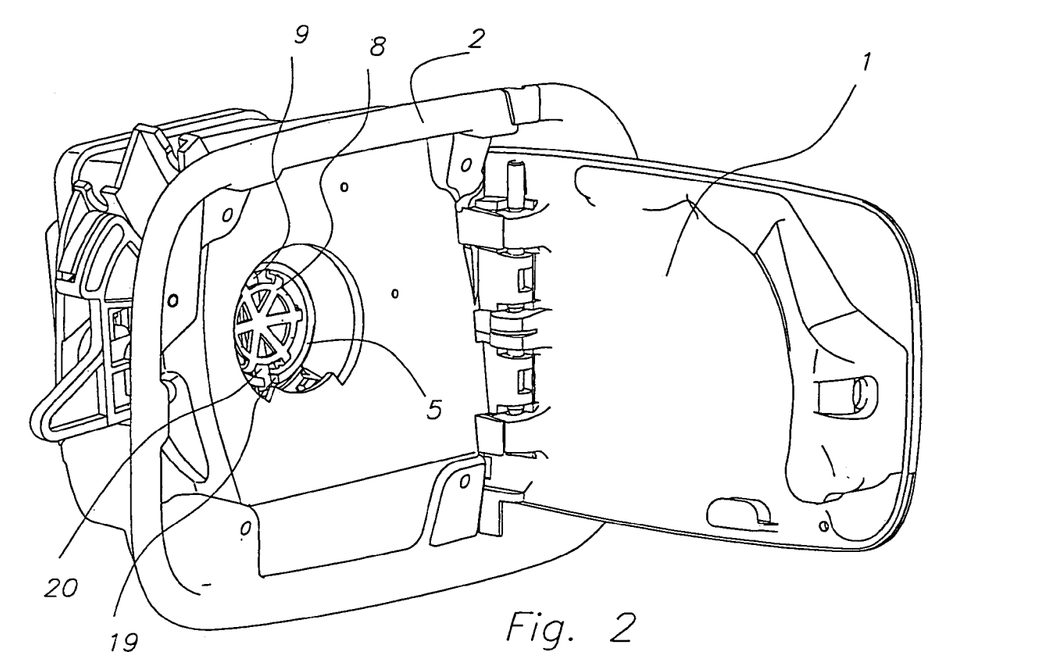
FIGS. 2 and 3 illustrate, by way of perspective views, the locking mechanism operated by the bodywork flap.

In FIG. 2, there can be seen a fuel tank filler head in a closed position, shutter locked, illustrating the flap (1), the flap housing (2), the spider (8) and the hairpin compression spring (9) terminated by a lug (20) flush with the surface of a notch (19) in the body (6). This notch (19) allows the hairpin spring (9) to protrude beyond the bezel (5).

Figure 3:
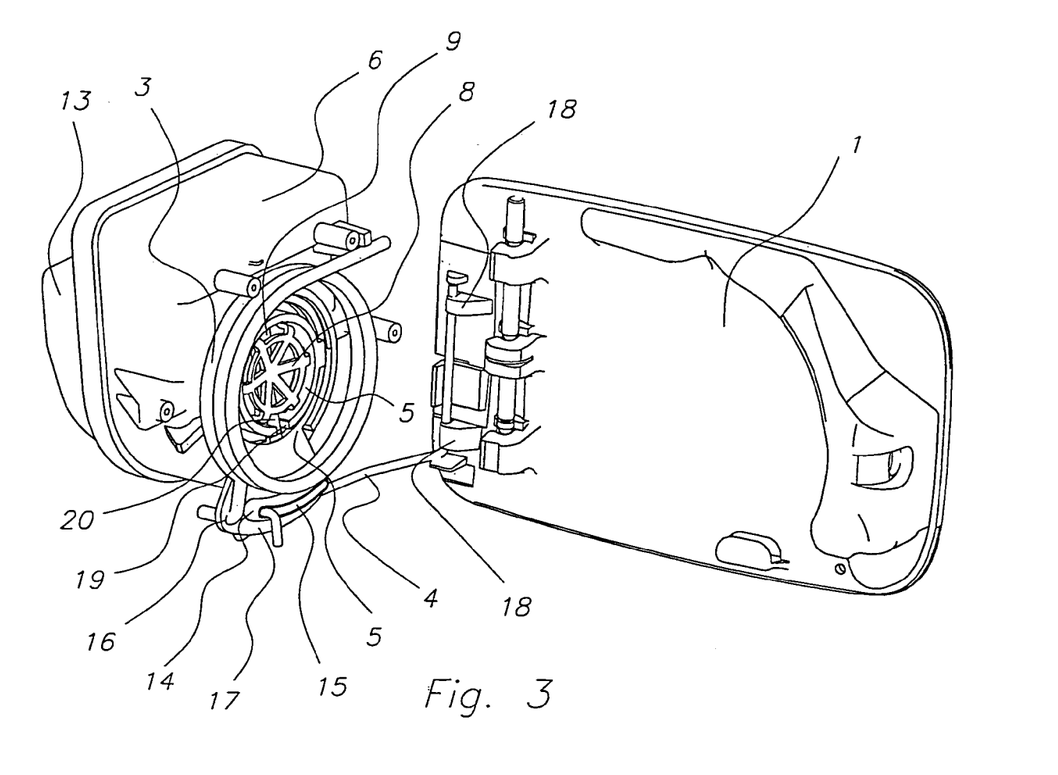

FIG. 3 depicts the pipe head in the same situation as in the preceding figures, the flap housing (2) having been removed so as to show the underlying components. There can be discerned here, besides the components already visible in FIG. 2, the body (6) supporting the bezel (5), the guide (13) and the tongue (17) of the bezel (5) bearing the orifice (16) into which is inserted the end of the spring (3) for rotationally returning the bezel into the unlocked position, here in the tensioned position, with the bezel (5) locked. The tongue (17) also bears an oblong piece (14) with a slideway (15), into which one end of the rod (4) is inserted and functions as a slider. The rod (4) has its other end inserted into two spindle supports (18) integral with the flap (1).

Figure 4:
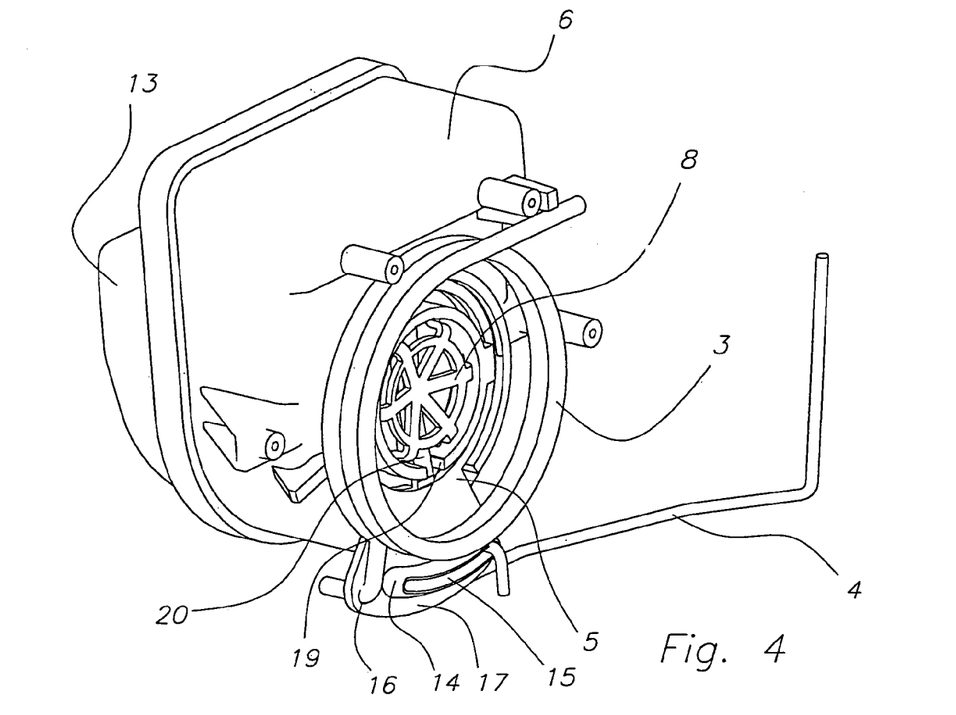
Figure 5:
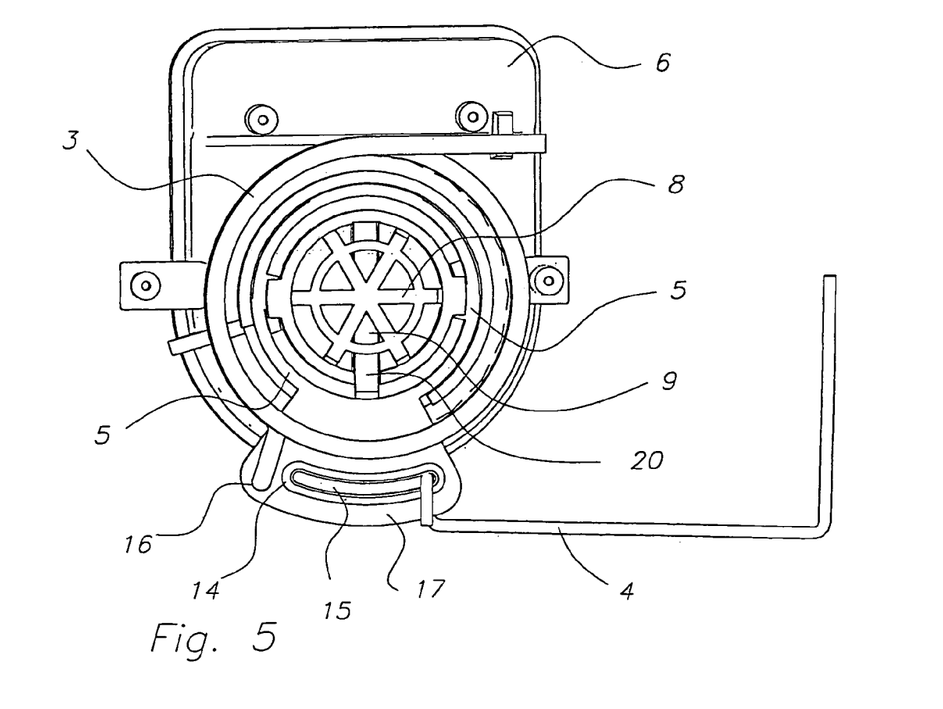

FIGS. 4 and 5 show a closed system, flap closed (not shown), bezel (5) locked and shutter closed. In these figures, it is possible to discern the body (6) bearing a notch (19) with whose surface the lug (20) of the hairpin spring (9) is flush, and also the spider (8). The tongue (17) of the bezel (5) bears the same elements (14) to (17) and the rod (4) as already described in FIG. 3.

Figures 6, 7:
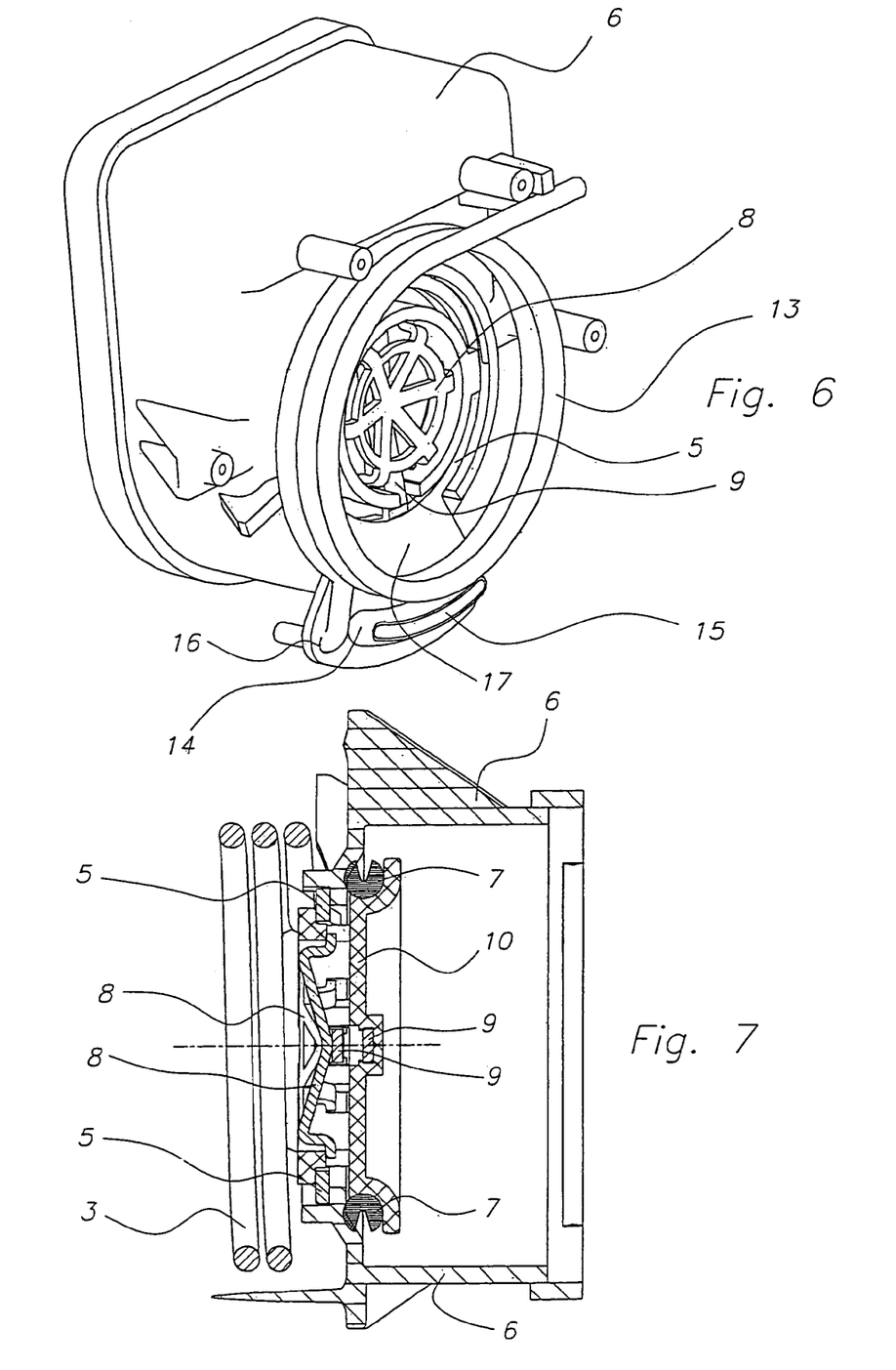
Figure 8:
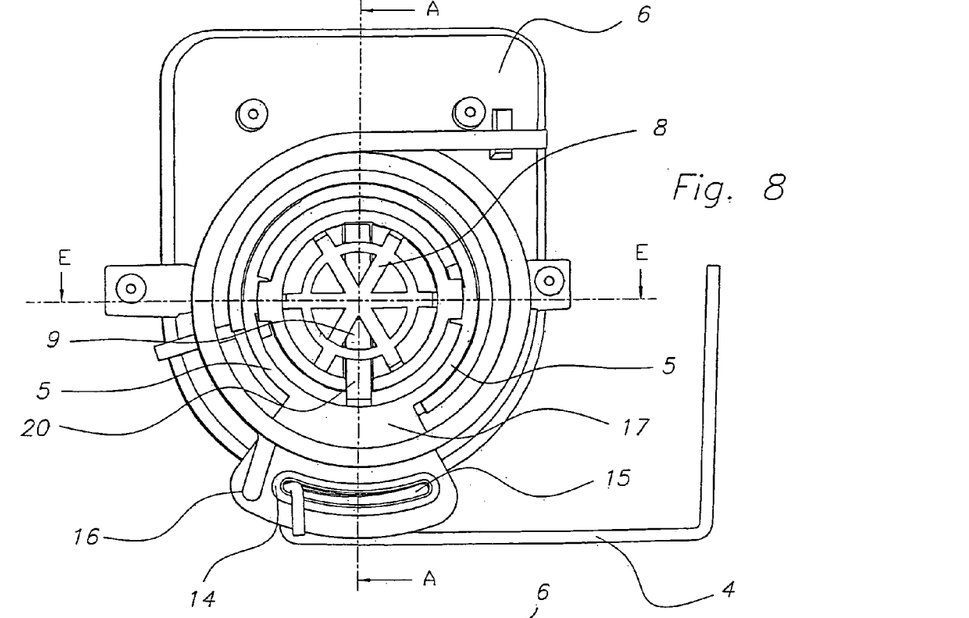
Figure 9:
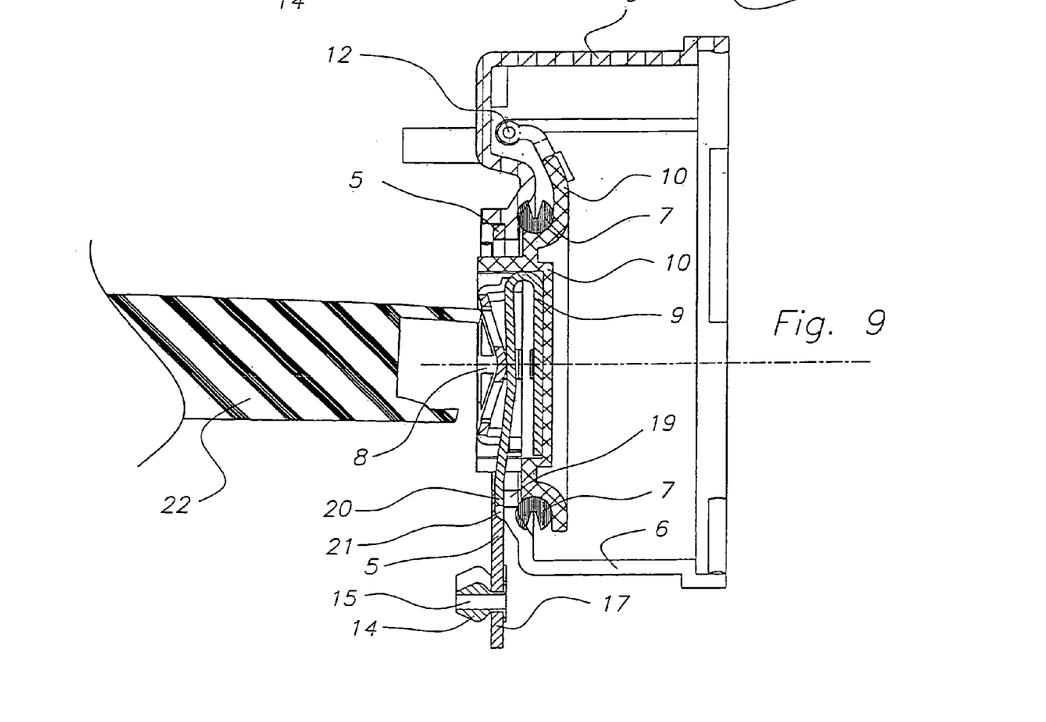
FIG. 9 is another view in section along axis AA of FIG. 8 showing the nozzle arriving against the spider.
Figures 10, 11:
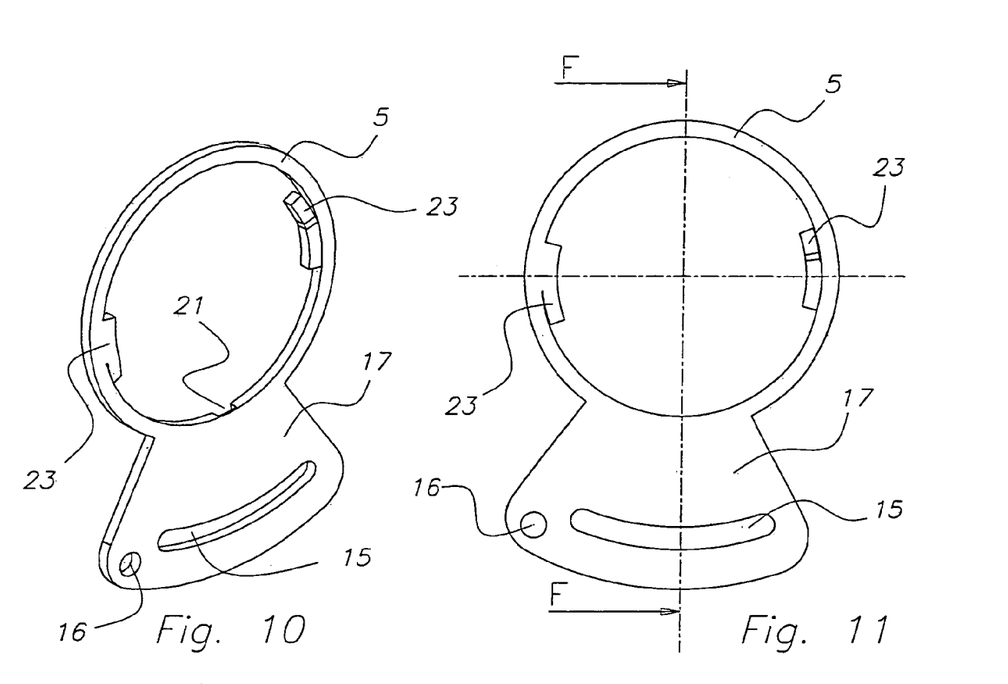
FIGS. 10 to 13 show the detail of the construction of a bezel, FIG. 10 being a perspective view, FIGS. 11 and 12 being plan views of each of the two faces of the bezel, and FIG. 13 being a view in section along axis FF of FIG. 11.
Figure 12:
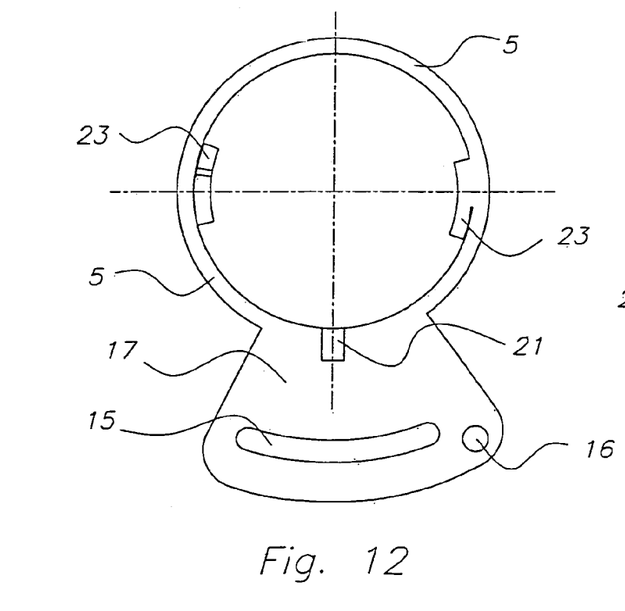
Figure 13:
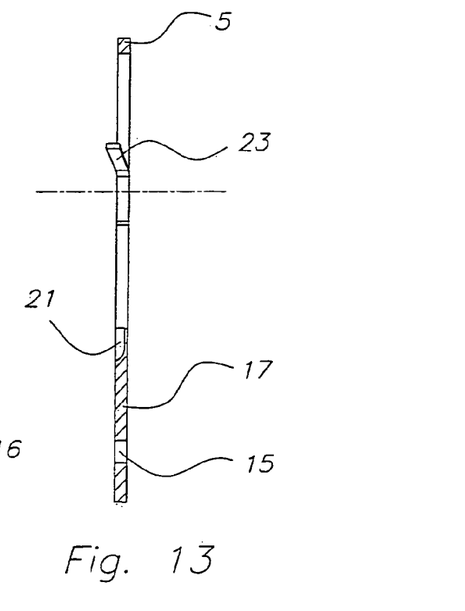
Figure 14:
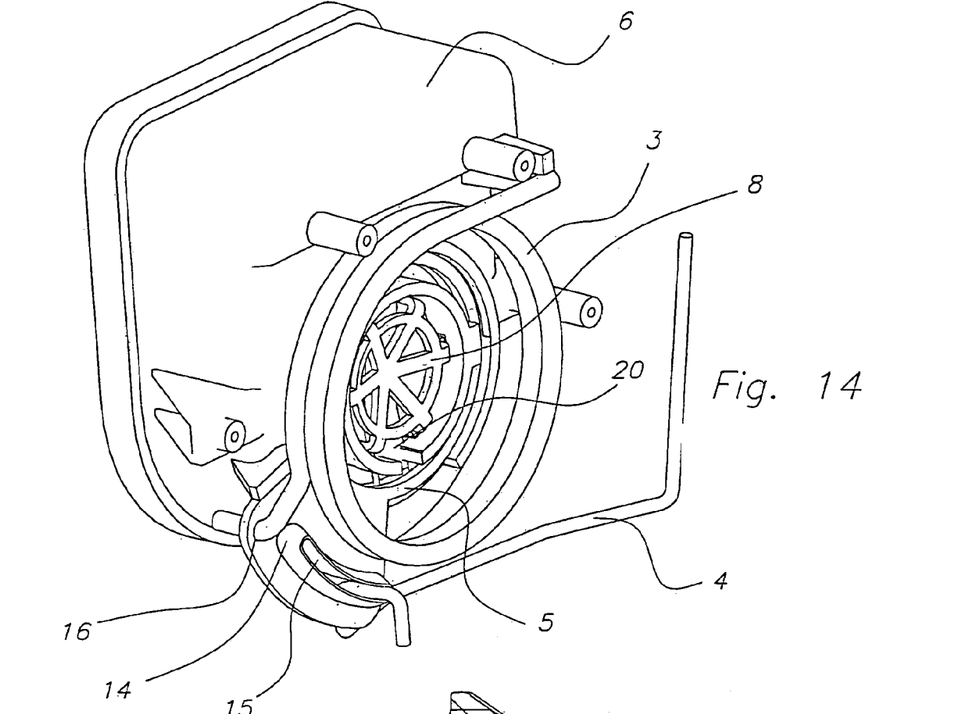
Figure 15:
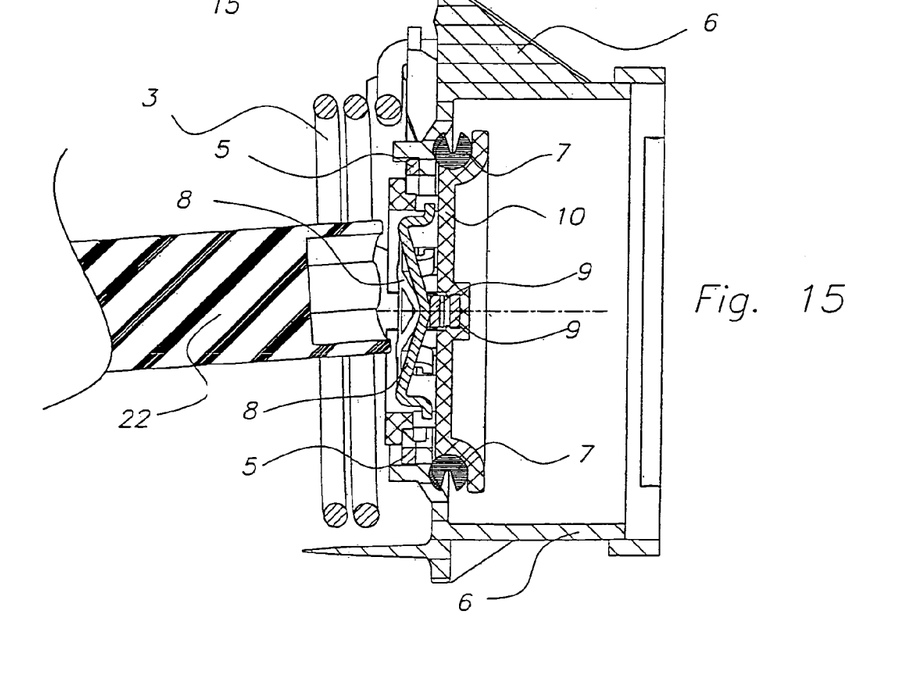
FIG. 15 is a view in section along axis DD marked on the plan view of FIG. 16.
Figure 16:
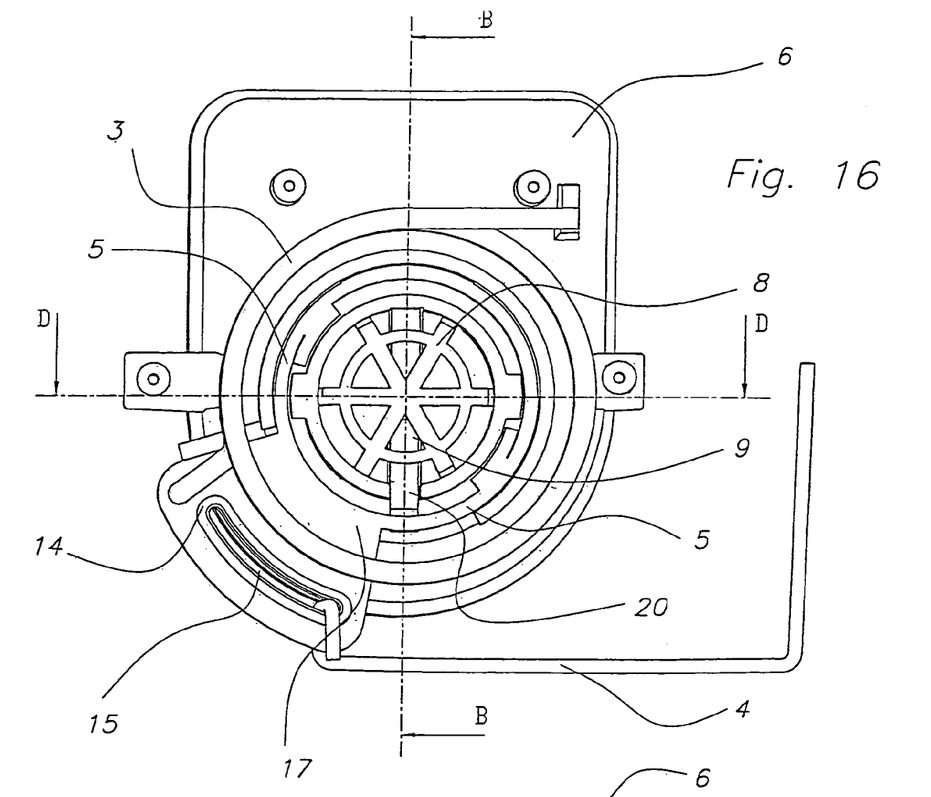
Figure 17:
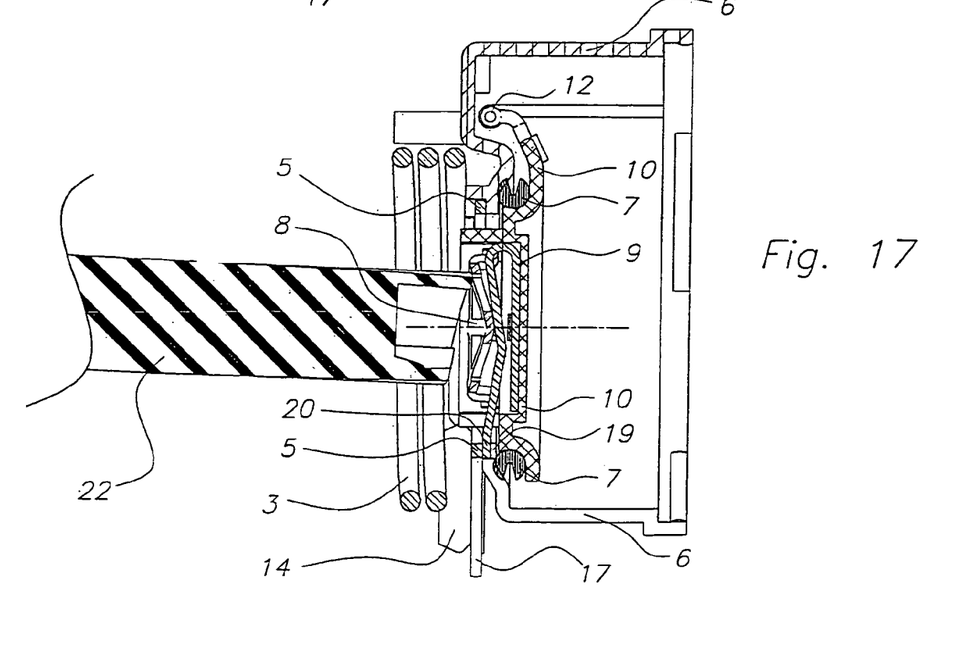
FIG. 17 is another view in section along axis BB of FIG. 16, showing the nozzle delivering a thrust force on the spider along an axis parallel to the axis of the head of the pipe. The squashing of the hairpin spring and the unlocking of the bezel can be discerned therein.
Figure 18:
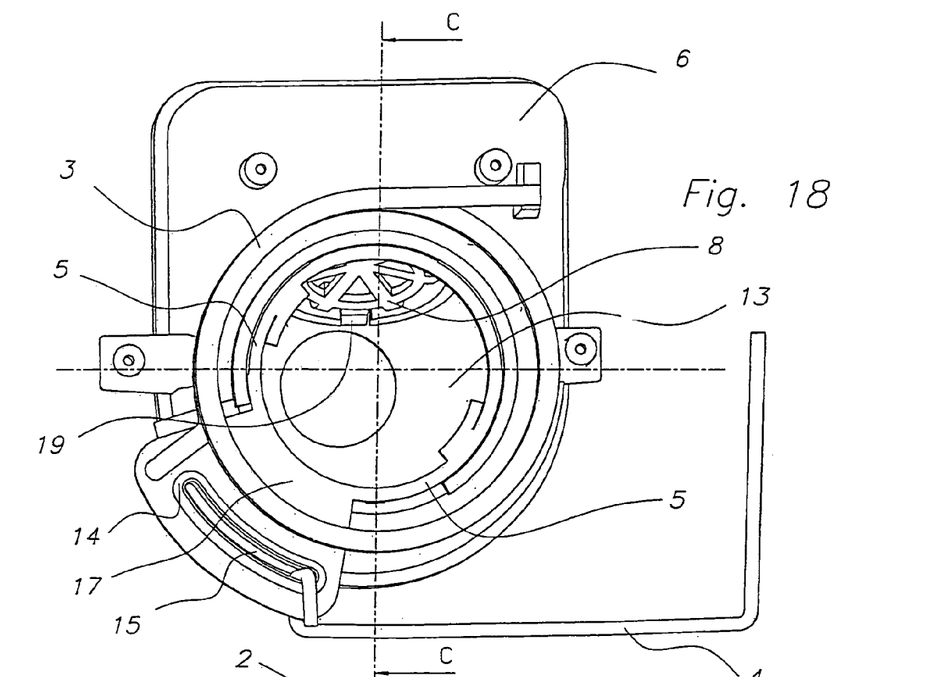

In FIG. 9, which is a section along axis AA of the plan view of FIG. 8, it is possible to see a filling nozzle (22) the end of which is butting against the spider (8). In this position, represented in the same situation in FIGS. 6 to 8, the flap is open and the end of the rod (4) (not shown in FIG. 6) has slid as far as the left-hand part of the slideway (15). However, the bezel (5) remains locked and the shutter (10) blocked in the closed position, because the lug (20) of the hairpin spring (9) has remained inserted in the notch (21) in the bezel (5). The flexible seal (7) is visible in the two sectional views of FIGS. 7 and 9. FIG. 9 again shows the notch (19) in the body (6) that enables the lug (20) of the hairpin (9) to protrude beyond the bezel (5).

In FIGS. 10 to 13 it is possible to discern the details of the bezel (5), the oblong piece (14) not being represented, however: the lugs (23) in the form of a bevel, the notch (21) into which the lug (20) of the hairpin spring (9) can be inserted, and the tongue (17) bearing the slot (15) and the orifice (16).

FIGS. 14 to 17 show the situation of the system with the nozzle (22) bearing against the spider (8) and compressing the hairpin spring (9), the lug (20) terminating the latter having left the notch (21) in the bezel (5) and entered the notch (19) facing it on the body (6). The torsion spring (3) has returned the bezel (5) into the unlocked position by turning it in the clockwise direction, thereby unblocking the shutter (10).

Figure 19:
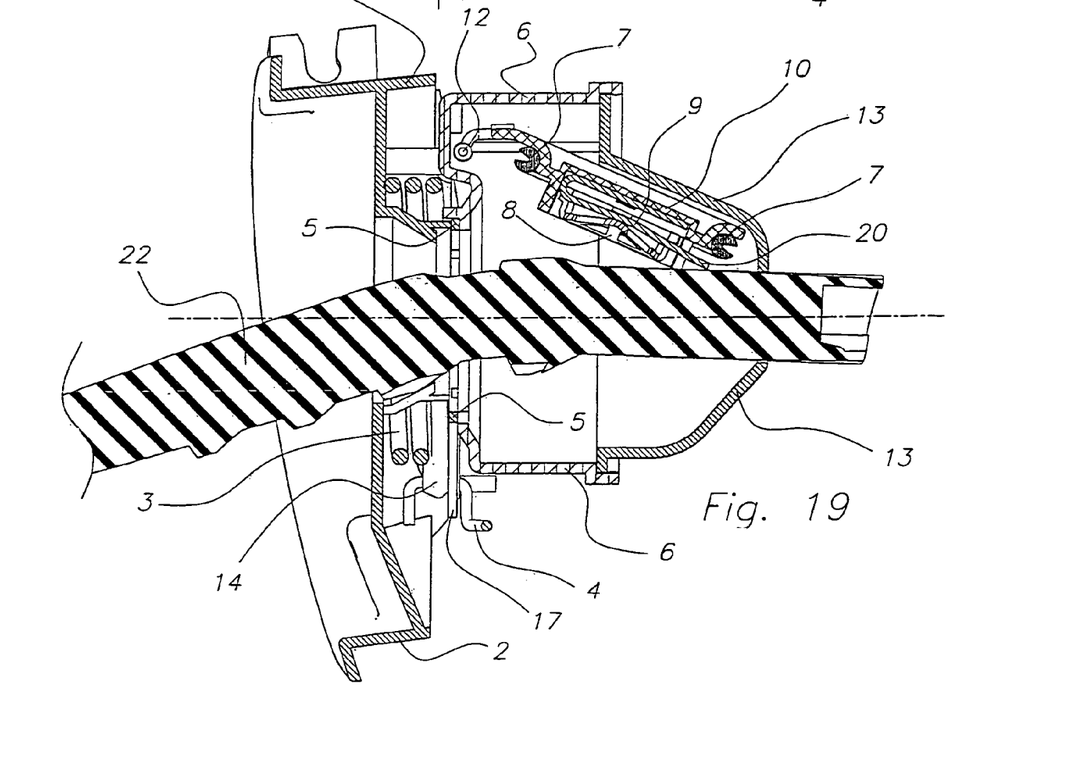

FIG. 19 shows the nozzle (22) completely engaged in the system and passing through the flap housing (2), the spring (3), the bezel (5), the body (6), and the guide (13). The shutter (10) has tilted about its spindle (12) and is held against the end region of the nozzle (22) by its return spring (11) (not visible in the sectional view of FIG. 19).

The invention claimed is:

1. A closure system integrated with a fuel tank filler head, comprising:
   a flap configured to protect said fuel tank filler when said flap is closed;
   a shutter enabling automatic opening of a pipe by action of a nozzle, according to which the shutter undergoes a retraction under action of a thrust force directed against the shutter along an axis parallel to an axis of the filler head;
   a return spring configured to return the shutter after said retraction to a closed position; and
   a lock mechanism configured to be activated as a result of said flap closing so as to prevent said retraction of said shutter when said flap is closed.

2. The system according to claim 1, wherein the lock mechanism comprises a rotatable bezel, said bezel being engaged, with a clamping engagement, with said shutter when said lock mechanism is activated.

3. The system according to claim 2, wherein the clamping engagement is produced by a bayonet device with interacting parts arranged, respectively, on an inner cylindrical surface of the bezel and on a periphery of the shutter.

4. The system according to claim 3, wherein the parts of the bayonet device include flattened lugs whose thickness varies in a form of a bevel and that are arranged inverted one on top of another.

5. A closure system integrated with a fuel tank filler head, comprising:
   a flap configured to protect said fuel tank filler when said flap is closed;
   a shutter enabling automatic opening of a pipe by action of a nozzle so that the shutter moves from a closed position to an open position under action of a thrust force directed against the shutter;
   a return spring configured to return the shutter from said open position to said closed position; and a bezel configured to rotate from a first position to a second position, wherein said bezel is locked with said shutter in said first position and said bezel is unlocked from said shutter in said second position so that said shutter can move from said closed position to said open position when said bezel is in said second position; and a torsion spring configured to keep the bezel in said second position when the shutter is open.

6. A closure system integrated with a fuel tank filler head, comprising:

a flap configured to protect said fuel tank filler when said flap is closed;

a shutter enabling automatic opening of a pipe by action of a nozzle so that the shutter moves from a closed position to an open position under action of a thrust force directed against the shutter;

a return spring configured to return the shutter from said open position to said closed position; and a bezel configured to rotate from a first position to a second position, wherein said bezel is locked with said shutter in said first position and said bezel is unlocked from said shutter in said second position so that said shutter can move from said closed position to said open position when said bezel is in said second position; and a rod configured to connect the bezel to the flap and to enable the bezel to be rotated into the first position when the flap is closed.

7. The system according to claim 5, further comprising a rod configured to connect the bezel to the flap and to enable the torsion spring to be tensioned and the bezel to be rotated into the first position when the flap is closed.

8. The system according to claim 6, wherein the rod is fastened to the bezel, constituting a slider of a slot in an oblong piece in a form of a slideway borne by a tongue integral with the bezel, the slideway being dimensioned such that an opening of the flap from a closed position has no effect on the locked position of the bezel.

9. The system according to claim 7, wherein the rod is fastened to the bezel, constituting a slider of a slot in an oblong piece in a form of a slideway borne by a tongue integral with the bezel, the slideway being dimensioned such that the opening of the flap from a closed position has no effect on the locked position of the bezel.

10. The system according to claim 5, wherein said bezel is configured to rotate into said first position as a result of said flap closing so as to prevent said shutter from moving into said open position.

11. The system according to claim 6, wherein the bezel is rotatable from said first position to said second position when said flap is open so as to allow said shutter to move into said open position when said thrust force is directed against said shutter.

12. A motor vehicle comprising the system according to claim 1.

13. The system according to claim 2, wherein the bezel is a truncated-cylinder bezel that includes a ring configured to turn about its axis and that is flattened on both of lower and upper faces.

14. The system according to claim 2, further comprising a seal between said shutter and said bezel.

15. The system according to claim 14, wherein said seal is compressible.

16. The system according to claim 15, wherein said seal is circular.

17. The system according to claim 16, wherein said seal is arranged at a periphery of said shutter.

18. The system according to claim 2, wherein the lock mechanism comprises a spider coupled to said shutter.

19. The system according to claim 18, wherein said spider has a lug configured to engage in a notch of said bezel when said lock mechanism is activated.

20. The system according to claim 2, wherein the lock mechanism is configured to be deactivated when said flap is open so as to allow said retraction when said thrust force is directed against said shutter.

* * * * *

UNITED STATES PATENT AND TRADEMARK OFFICE
CERTIFICATE OF CORRECTION

| | | |
|---|---|---|
| PATENT NO. | : 7,063,113 B2 | Page 1 of 1 |
| APPLICATION NO. | : 10/484718 | |
| DATED | : June 20, 2006 | |
| INVENTOR(S) | : Jerome Ropert et al. | |

It is certified that error appears in the above-identified patent and that said Letters Patent is hereby corrected as shown below:

Column 5, line 25, delete "(2)" (second occurrence) and insert --(3)--.

Signed and Sealed this

Seventeenth Day of October, 2006

JON W. DUDAS
*Director of the United States Patent and Trademark Office*